United States Patent

[11] 3,557,837

[72] Inventor Harry L. Giwosky
 Milwaukee, Wis.
[21] Appl. No. 792,651
[22] Filed Jan. 21, 1969
[45] Patented Jan. 26, 1971
[73] Assignee Controls Company of America
 Melrose Park, Ill.
 a corporation of Delaware

[54] MODULATING VALVE
 4 Claims, 4 Drawing Figs.
[52] U.S. Cl. .................................................... 137/630.14,
   251/85
[51] Int. Cl. .................................................... F16k 1/52
[50] Field of Search ........................................... 137/516.29,
   599, 599.2, 630, 630.11, 630.14, 630.15; 251/85

[56] References Cited
 UNITED STATES PATENTS
| | | | |
|---|---|---|---|
| 158,622 | 1/1875 | Burnett .......................... | 137/630.14 |
| 2,979,072 | 4/1961 | Webste.......................... | 137/630.14X |
| 3,128,792 | 4/1964 | Rule .............................. | 137/630.14X |
| 3,198,204 | 8/1965 | Parks............................. | 137/630.15X |

*Primary Examiner*—Robert G. Nilson
*Attorneys*—John W. Michael, Gerritt D. Foster, Bayard H. Michael, Paul R. Puerner, Joseph A. Gemignani, Andrew O. Riteris and Spencer B. Michael

ABSTRACT: As the valve moves towards its seat the dished resilient face seats first so flow is then confined to passing through the slots in the face. As further closing movement occurs the slots are gradually seated against the backing plate to gradually cut off flow until the slots are completely blocked. The percentage of maximum flow for a given valve opening movement more closely follows the ideal.

Inventor
Harry L. Giwosky
By Bayard H. Michael
Attorney

MODULATING VALVE

BACKGROUND OF INVENTION

When it is desired to modulate the gas supply to a burner the usual practice employs an on-off valve controlling flow at a minimum value with another—modulating—valve controlling flow above the minimum. The control operating the modulating valve imparts a linear motion to the valve. If the valve is flat a very small opening results in excessive flow. Effort to taper the valve, etc. are not very successful since flow is still too high or the required valve movement is too large.

SUMMARY OF INVENTION

The present valve essentially includes a backing plate provided with a dished resilient face having openings therein which remain open after the face initially seats and which are gradually cut off as the face is deflected against the backing plate as closing movement continues. The number, location, and shape of the slots can be varied to "tailor" the flow characteristics. Upon opening the valve a spaced spider or washer will pick up the resilient face to unseat it at a given point of travel.

DESCRIPTION OF PREFERRED EMBODIMENT

Figure 1:
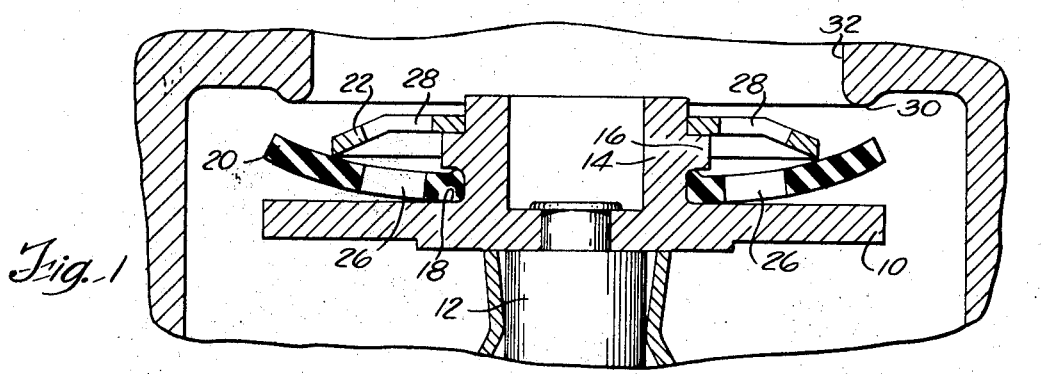
FIG. 1 is a vertical section showing the valve fully open.

The backing plate 10 is fixed on the end of stem 12 and has a sleevelike projection 14 extending axially with a collar 16 defining a groove 18 adjacent the backing plate. The resilient dished face member has a central aperture allowing the face to be stretched over and retained in the groove 18. The central aperture of washer 22 fits over the end of projection 14 which is then staked to retain the washer in position.

Figure 2:
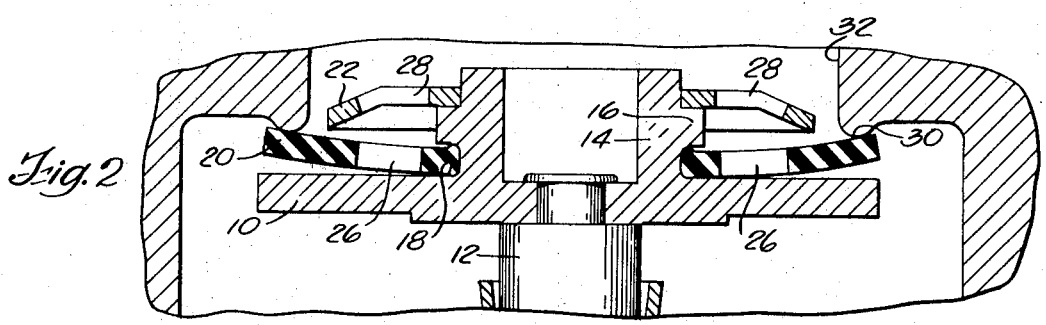
FIG. 2 is a vertical section showing the face just seating.
Figure 3:
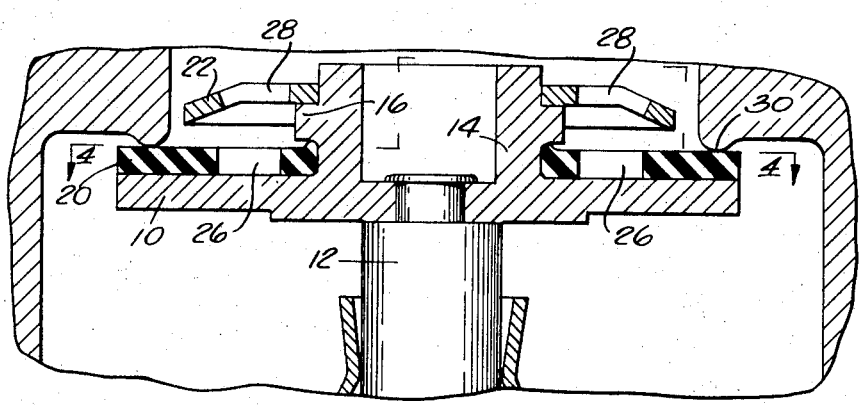
FIG. 3 shows the face fully seated.
Figure 4:
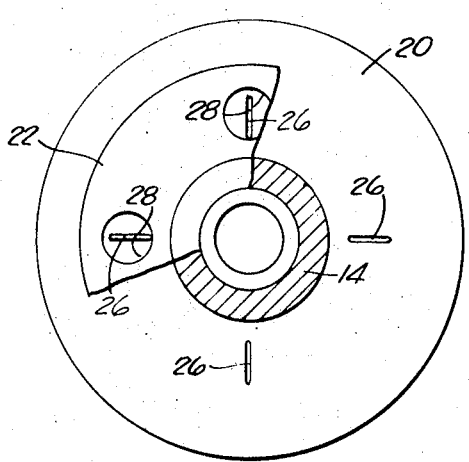
FIG. 4 is a view on lines 4—4 of FIG. 3 showing the apertures in the face and the washer.

As seen in the drawings, the face is provided with four generally radially disposed slots 26 through which gas may flow when the valve is positioned as in FIGS. 1 or 2. The washer 22 has a number of holes 28 allowing passage of gas. Gas flow is up in the drawings in the direction seating the valve. In FIG. 1 the valve is fully open and the great majority of flow passes between the face and seat 30 leading to conduit 32. As the stem 12 rises, the face approaches the seat 30 gradually throttling flow therebetween until it finally seats on seat 30 (FIG. 2). At this time gas can flow between the face and backing plate 10 and through slots 26 and holes 28 in washer 22. Continued rising of stem 12 will now push face 20 towards plate 10 which gradually closes off the slots 26 until the valve is fully closed (FIG. 3) with the resilient face sandwiched between plate 10 and seat 30 to effect complete (gastight) closure. When the operating control starts to lower the stem, the slots 26 are gradually opened to give the desired flow increase for increment of stem movement. When the FIG. 2 position is reached, the inverted cupped washer will abut face 20 and lift it from seat 30 against the gas pressure. This arrangement insures opening the main flow at the desired point in stem travel. The washer function could be realized by a spider or the like.

It will be appreciated the variations in the slots are infinite. More or less slots may be used and the radial positioning can be varied to have them effective at different stages of valve movement. Further, the shape of the slots can be varied. The possibilities here coupled with variation of the point at which the face seats makes it possible to design for almost any desired flow curve.

I claim:

1. A valve cooperable with a valve seat to control flow through a passage, the valve including:
    a backing plate;
    a resilient face on the plate prestressed to a dished configuration;
    an aperture in the face within the projection of the passage and positioned to allow flow therethrough from the space between the face and plate when the face is dished;
    the peripheral portion of the face being seated on the valve seat as the valve is closed whereby flow past the valve passes through the aperture; and
    continued closing movement of the plate towards the seat being effective to gradually deflect the face and restrict the flow through the aperture until the valve is fully closed.

2. A valve according to claim 1 including a member spaced from the face and fixed in position to limit deflection of the face away from the plate.

3. A valve according to claim 1 in which there are a plurality of apertures and the aperture size, shape and location are selected to give a desired flow characteristic (flow rate v. valve travel).

4. A valve according to claim 2 in which there are a plurality of apertures and the aperture size, shape and location are selected to give a desired flow characteristic (flow rate v. valve travel).